April 21, 1964     W. HINZ ETAL     3,130,394
ARRANGEMENT FOR DETECTING THE STOPPAGE OF A MOVABLE BODY
Filed Dec. 2, 1960
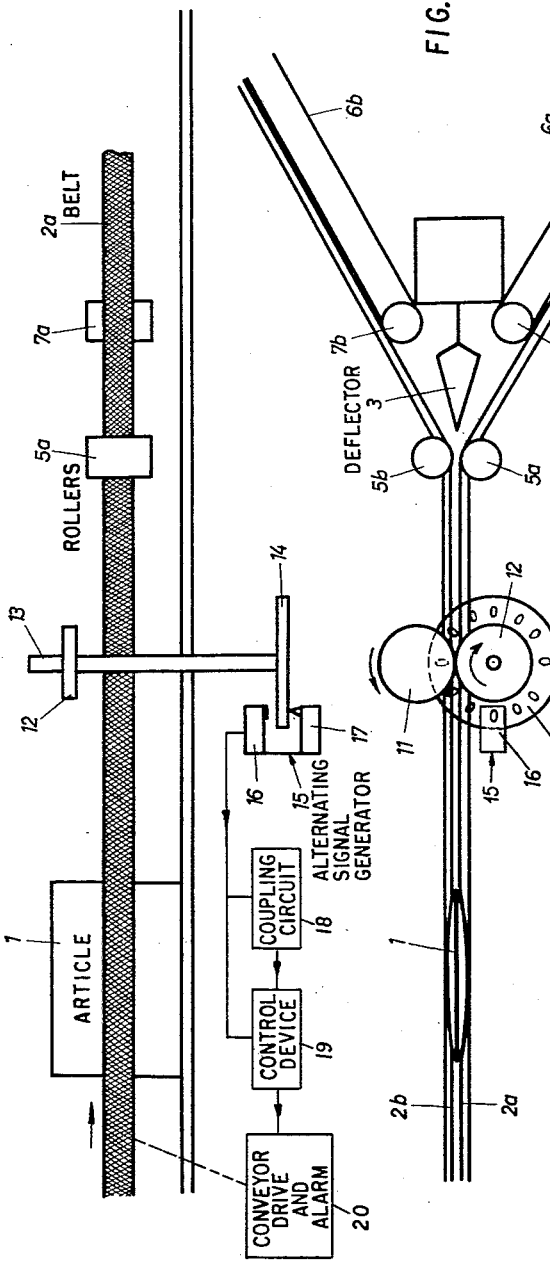
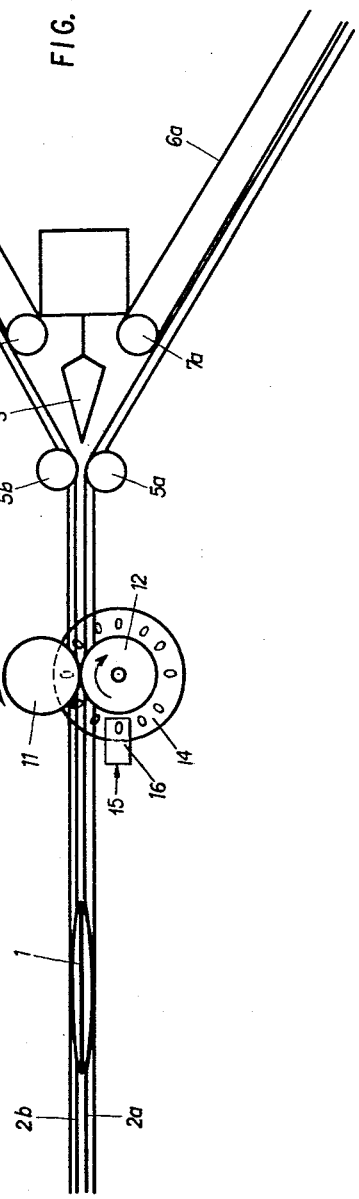
INVENTOR
WERNER HINZ
HANSPETER FRITZSCHE
BY Paul W. Hemminger
AGENT 3,130,394
ARRANGEMENT FOR DETECTING THE
STOPPAGE OF A MOVABLE BODY
Werner Hinz, Berlin-Neukoln, and Hanspeter Fritzsche, Berlin, Germany, assignors to International Standard Electric Corporation, New York, N.Y., a corporation of Delaware
Filed Dec. 2, 1960, Ser. No. 73,376
Claims priority, application Germany Dec. 7, 1959
6 Claims. (Cl. 340—259)

This invention relates to a stoppage detector and more particularly to apparatus for detecting the stoppage of an article on a conveying path.

In production lines or transportation systems it is often the problem to detect whether or not an object is moving at a certain point of the conveying line or path. This problem is particularly important in edgewise conveying systems adapted to convey flat articles, such as letters and the like. Such conveying systems either comprise bent conveying sections for effecting a direct redirection, or comprise mechanical deflectors for the branching-off into a siding or secondary section. These and similar sections of conveying systems often prove to be sources of trouble, because in these sections the article to be conveyed can be retarded in its movement, and thus cause a jamming or a stoppage of the system. This may have a disturbing effect upon the entire system. For this reason it is important that the trouble and its location are immediately recognized.

Quite a number of methods are known for solving this problem. For example, it is customary to register the entrance of an article being conveyed into an endangered section of the conveying path, as well as the exit of such an article out of such a section. As soon as two or more dispatch articles are located in one section a trouble indicator is actuated. Another method registers the time during which a conveying article is located in a certain section of the conveying path. If a certain period of time is exceeded, then this is evaluated as a criterion for indicating an operating trouble. These and similar methods, however, have the disadvantage of not directly determining the actual trouble, but only the possible cause of the trouble which, under certain circumstances, might not result in faulty operation.

These disadvantages can be avoided by directly detecting whether the article to be conveyed is moving or not. For this reason the present invention has as its main object to provide an arrangement which is suitable to this end, and to provide measures which are necessary for using the arrangement in a conveying system in an economical and reliable way as far as the operation is concerned. The invention is in particular suitable for employment with edgewise conveying systems adapted to convey flat articles.

The invention consists of a rotating alternating voltage generator as well as a system for operating or driving the generator in such a way that the generator is switched off by the action of an article which has come to a standstill along the conveying path. In other words, the generator is separated from its driving system and is therefore stopped. The voltage normally appearing at the terminals of the generator is suppressed, and this causes a criterion for indicating the existence of a trouble. This criterion may then be evaluated by a corresponding control arrangement.

When using such an arrangement in edgewise conveying systems for conveying flat articles, to which the invention, however, is in no way restricted, the alternating voltage generator and its driving system are arranged on opposite sides of the conveying channel. The power-transmission elements of both the generator and the driving system are pressed against one another. A passing conveying article is moved between these transmission elements and becomes a part of the power transmission. If this article to be conveyed comes to a standstill, while between the power-transmission elements, the power transmission is interrupted and the voltage disappears at the generator output. The generator may be of the most simple type, for example, a photoaudion generator (light siren) or a magnetic siren sensing element, which are capable of producing a sufficient control voltage. Under certain circumstances it is also sufficient to provide a rotating contact breaker connected in series with a source of voltage. However, in view of the disadvantages of the contact-operated arrangements it is advisable to prefer other types of voltage generators. The alternating voltage produced at the output of the generator is applied in the conventional manner via a coupling circuit, for example, a transformer to a control device which is adapted to put the endangered section of the conveying path out of operation, or to provide an alarm signal.

The above-mentioned and other features and objects of this invention and the manner of attaining them will become more apparent and the invention itself will be best understood by reference to the following description of an embodiment of the invention taken in conjunction with the accompanying drawings, in which:

FIG. 1 shows a side view of a conveying section equipped with the inventive arrangement, and FIG. 2 shows the top view of an arrangement according to FIG. 1 excluding elements 18, 19, and 20 for the sake of clarity.

FIG. 2 of the drawings shows an edgewise conveying system in which the articles 1 to be conveyed travel by being clamped between belts 2a and 2b. At the end of the conveying section there is arranged a mechanical deflector 3 for splitting up the conveying path into two separate tracks. The conveyor belts are guided over rollers or pulleys 5a and 5b, and the deflector 3 is followed by further belts 6a and 6b, which are guided over the rollers or pulleys 7a and 7b. Depending on the position of the mechanical deflector 3 the article 1 to be conveyed is either fed into the right-hand or the left-hand channel.

Immediately in front of the deflector is the location where most of the troubles appear, and where the dispatch articles are most likely to jam. In the case of different kinds of dispatch articles the different dimensions of the articles have to be taken into consideration which, however, cannot always be achieved to completely the same extent. Very thick or very rigid dispatch articles are likely to contact the deflector in such a manner as to become jammed. It is also possible for two dispatch articles to adhere to one another and thereby cause trouble at the deflector arrangement.

The arrangement for detecting whether the dispatch article 1 is moving or not consists of friction rollers 11 and 12 which are arranged on opposite sides of the conveying path. Both of the rollers are pivoted, and their shafts are pressed resiliently toward each other. The roller 11 is either driven by a special motor, or else is driven at such a speed that the rotational speed or number of rotations of the disk 11 is almost equal to the speed of the conveyor belts. The disk 12 is driven directly by the disk 11 and carries on its shaft 13 the apertured disk 14 of a light siren signal generator 15, consisting of a photoelectric cell 16 and of a source of light 17.

A dispatch article moving along the conveying path passes between the rollers 11 and 12. If the dispatch article is moving, the rotation of the roller 11 is transferred to the roller 12 through the article. However, if this dispatch article is stopped for any reason the roller 11 continues to rotate; but the roller 12 and, consequently, the light siren, is stopped. The alternating signal voltage at the terminals of a transformer energized by the light siren, is reduced to zero. This causes the armature of a relay control device to drop off, and the closure of the back contacts of the relay releases the desired control for securing the conveying operation and drive.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. Apparatus for detecting the stoppage of an article along a conveying path including edgewise conveying belts for transporting articles therealong comprising means generating an alternating voltage signal in accordance with the movement of said conveying path and article, including a movable member and a relatively fixed sensing means and means for mounting said movable member and said fixed sensing means for rotational movement independent of the conveying belts, drive means for driving said movable member in a rotary motion, including a driving power-transmission disk connected to said drive means to operate at a speed substantially equal to that of the conveying path, and a driven power-transmission disk connected to said movable member, said driving disk and said driven disk being resiliently urged into driving contact with one another and located in line with said conveying path so that articles being conveyed thereon pass between said driving and driven disks without interrupting the power transmission to said movable member, the transmission of power to said movable member being interrupted when any said article is stopped between said disks, said sensing means positioned in cooperative relation with said movable member to provide said alternating signal and signal interruption in accordance with the movement of said member, and control means responsive to said alternating signal and signal interruption to provide an indication when said article is stopped.

2. Apparatus according to claim 1 wherein the conveying path is in an edgewise conveying system for conveying flat articles, such as letters and said signal generating means and said driving means are on opposite sides of said conveying path.

3. Apparatus according to claim 1, wherein said control means comprises a relay and including circuit means coupling said alternating signal to said relay, and means operated by said relay to stop said conveyor path movement.

4. Apparatus according to claim 1, wherein said control means comprises a relay and including circuit means coupling said alternating signal to said relay, and alarm means operated by said relay to indicate the stoppage of said article.

5. Apparatus according to claim 1, wherein the movable member comprises a rotatable apertured disc, and said sensing means comprises a source of light and a photocell positioned on opposite sides of said apertured disc, said photocell producing alternating electrical pulses in accordance with the passage of light through the apertures of said disc during rotation.

6. Apparatus according to claim 1, wherein said sensing means is spaced from said signal generating means in a non-contacting arrangement.

References Cited in the file of this patent

UNITED STATES PATENTS

| 2,451,816 | Dunn | Oct. 19, 1948 |
| 2,472,526 | Frazee | June 7, 1949 |
| 2,813,717 | Mentzer | Nov. 19, 1957 |

FOREIGN PATENTS

| 549,393 | Great Britain | Nov. 19, 1942 |
| 1,070,421 | Germany | Dec. 3, 1959 |